United States Patent [19]

Gruffaz et al.

[11] 4,016,114
[45] Apr. 5, 1977

[54] HEAT-STABLE CELLULAR MATERIALS

[75] Inventors: Max Gruffaz, La Mulatiere; Bernard Rollet, Lyon, both of France

[73] Assignee: Rhone-Poulenc Industries, Paris, France

[22] Filed: June 14, 1976

[21] Appl. No.: 695,403

[30] Foreign Application Priority Data

June 30, 1975 France .............................. 75.20455

[52] U.S. Cl. .......................... 260/2.5 N; 260/37 R; 260/38; 260/39 SB; 260/50; 260/63 N
[51] Int. Cl.² ........................................... L08J 9/10
[58] Field of Search ................ 260/63 N, 50, 2.5 F, 260/2.5 N

[56] References Cited

UNITED STATES PATENTS 3,951,902  4/1976  Jones et al. ...................... 260/63 N

OTHER PUBLICATIONS

Org. Synth. Coll. vol. 1, p. 278 (July 1942).
J.A.C.S. 52 (1930) p. 4965, Drake et al.

*Primary Examiner*—Morton Foelak
*Attorney, Agent, or Firm*—Stevens, Davis, Miller & Mosher

[57] ABSTRACT

A cellular material is disclosed based on a polymer with imide groups, characterized in that it is obtained by heating a mixture comprising:
a. a bis-maleimide of the formula

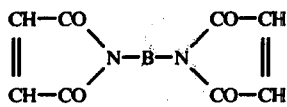

in which the symbol B represents a phenylene radical or a radical of the formula

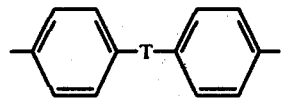

where T represents —CH$_2$—, —O— or —SO$_2$—;
b. a furfuraldehyde derivative of the formula $$\Sigma - R_1 - CO - R_1 - \Sigma'$$

in which the symbol Σ represents a radical of the formula

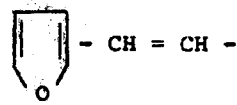

and the symbols R$_1$ represent a valency bond or a —CH=CH— group, and the symbol Σ' represents a radical Σ, an aliphatic, cycloaliphatic or aromatic monovalent radical R containing up to 12 carbon atoms, or a —R'—CO—R'' radical, where R' represents an aliphatic, cycloaliphatic or aromatic divalent radical containing up to 12 carbon atoms and R'' represents a monovalent radical R or a radical Σ; and
c. a blowing agent.

8 Claims, No Drawings

HEAT-STABLE CELLULAR MATERIALS

The present invention relates to cellular materials based on polymers with imide groups.

These cellular materials are characterized in that they are prepared by heating a mixture comprising:

a. a bis-maleimide of the formula

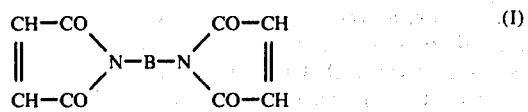

in which the symbol B represents a phenylene radical or a radical of the formula

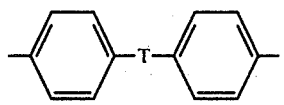

where T represents $-CH_2-$, $-O-$ or $-SO_2-$;

b. a furfuraldehyde derivative of the formula

in which the symbol $\Sigma$ represents a radical of the formula

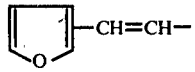

and the symbols $R_1$ represent a valency bond or a $-CH=CH-$ group, and the symbol $\Sigma'$ represents a radical $\Sigma$, an aliphatic, cycloaliphatic or aromatic monovalent radical R containing up to 12 carbon atoms, or a $-R'-CO-R''$ radical, where $R'$ represents an aliphatic, cycloaliphatic or aromatic divalent radical containing up to 12 carbon atoms, and $R''$ represents a monovalent radical R or a radical $\Sigma$; and c. a blowing agent.

In the mixture defined above, the weight ratio: bis-maleimide/furfuraldehyde derivative is generally between 5/1 and 15/1 and preferably between 8/1 and 12/1.

The amount of blowing agent (c) generally represents 1 to 15%, and preferably from 2 to 10%, of the weight of the mixture of bis-maleimide + furfuraldehyde derivative.

The cellular materials are obtained by heating the various ingredients which have beforehand been mixed intimately. The temperature of heating is linked to the nature of the products used, and especially to the decomposition temperature of the blowing agent. In general terms, it is between 150° and 200° C.

The bis-maleimide used preferably is N,N'-4,4'-diphenylmethane-bis-maleimide.

The derivatives of the formula (II) in which $R_1$ represents the valency bond are condensation products of furfuraldehyde with monoketones of the formula $CH_3-CO-R$ (III) or with diketones of the formula $CH_3-CO-R'-CO-R$ (IV), in which formulae the symbols R and R' have the meaning given above.

Amongst these ketones there may in particular be mentioned acetone, methyl ethyl ketone, acetophenone and diacetylbenzene. The products of the formula (II), in which at least one of the symbols $R_1$ represents $-CH=CH-$, can be prepared by reaction of acetone with the product obtained from furfuraldehyde and acetaldehyde.

The derivatives of the formula (II) preferably used in this invention are furfurylidene-acetone, difurfurylidene-acetone, furfurylidene-acetophenone, 1,4-bis-(furfurylidene-acetyl)-benzene and 1,7-bis-(furfurylidene)-hepta-2,5-dien-4-one.

The derivatives of the formula (II) can be prepared by application of the methods described, for example, in Traite de Chimie Organique — GRIGNARD — Volume XVIII, page 147; in Org. Synth. Coll. Volume I, page 278; and in JACS 52 (1930), page 4,965.

The blowing agent can be chosen from amongst the products of this type cited, for example in the work by Calvin J. BENNING, "Plastics Foams", Volume 2, pages 294–320. Particularly advantageous results are obtained by using azodicarbonamide for this purpose.

In addition, a cell-forming agent can be used in the preparation of the cellular materials according to the present invention. This adjuvant can be chosen from amongst non-ionic surface-active agents, such as organopolysiloxanes with polyoxyalkylene blocks. It is also possible to utilize cationic agents such as N-alkyl-trimethylenediamine dioleates or condensates of ethylene oxide with aminated coconut oil. It is also possible to utilize esters such as those obtained from lauric acid and polyalkylene glycols.

The amount of cell-forming agent generally does not exceed 5% of the weight of the mixture of bis-maleimide + furfuraldehyde derivative.

The cellular materials according to this invention can advantageously contain fibrous substances, especially glass fibres, in a dispersed form in the cellular structure. These fibres, which it is desirable to use in the form of individual fibres (as commercial fibres are most frequently agglomerated, it is advisable to desize and grind them), are generally mixed dry with the other ingredients and their presence makes it possible to obtain a material which has remarkably fine and regular cells. If a material such as glass fibres is used, the amount of this material can represent up to 20%, and preferably from 5 to 15%, of the weight of the mixture of bis-maleimide + furfuraldehyde derivative. The length of the fibres is usually between 0.5 and 20 mm; preferably, fibres having a length of from 1 to 10 mm are used.

The cellular materials according to this invention can be used in numerous fields, especially in the building industry and in the aeronautical and space industries. They can in particular be used for the production of panels for the interior fitment of aircraft, for example in producing small compartments forming the toilets or the cooking recesses, or for fitting-out of luggage compartments. These cellular materials exhibit remarkable fire resistance, being at one and the same time self-extinguishing and particularly resistant to the spread of flame. Furthermore, when subjected to an intense flame, their combustion produces practically no smoke.

The examples which follow, and which are given without implying any limitation, still further illustrate the invention.

EXAMPLE 1

100 g of N,N'-4,4'-diphenylmethane-bis-maleimide, 6 g of azodicarbonamide, 1.2 g of an N-alkyltrimethylenediamine dioleate marketed under the trademark "Duomeen Odo", and 0.7 g of a surface-active agent of the polyalkylene glycol laurate type marketed under the trademark "Cepretol J", are mixed intimately at 25° C, and 10 g of furfurylidene-acetone which has beforehand been ground and cooled to −10° C are incorporated into the mixture.

After homogenizing the mixture, 75 g of the product thus obtained are placed in a vessel consisting of a steel frame of size 150 × 150 × 30 mm (internal dimensions), placed on an aluminum foil which is turned up along the external walls of the frame. The assembly of frame + aluminum foil is placed on a chromed brass plate and another chromed brass plate covered, on the side facing the interior of the vessel, with another aluminum foil, is fitted in a non-leaktight manner, onto the frame.

The vessel thus formed, which contains the mixture defined above, is placed between the platens of a press, these platens having been preheated to 170° C.

The upper platen of the press is brought into contact with the brass plate covering the vessel without applying pressure, so as to permit degassing to take place.

The assembly is left for 15 minutes between the platens (at 170° C) to allow the foam to expand, and the temperature is then raised to 190° C (15 minutes).

The cellular material is reheated outside the mould for 20 hours at 250° C.

A parallelepiped of dimensions 12.7 × 12.6 × 2.9 cm is cut from the foam sheet. This sample weighs 44.23 g. Thus the density of the foam is 0.095.

The compressive strength, for 10% compression, of a 5 × 5 cm sample is measured in accordance with Standard Specification ASTM D 1621.64 (traversing speed: 2.5 mm/minute). The figure obtained is 1.8 kg/cm².

The LOI (determined by applying Standard Specification ASTM D 2863.70: Flammability of plastics using the oxygen index method) is 40–41.

EXAMPLE 2

The experiment of Example 1 is repeated, this time replacing the furfurylidene-acetone by the same amount of furfurylidene-acetophenone.

The only modifications in the procedure are:

Expansion phase: 25 minutes at 175°–180° C, followed by 35 minutes at 200°–205° C.

Reheating: 15 hours at 250° C.

A cellular material of density 0.103 is obtained.

EXAMPLE 3

6 mm long glass fibres are used. These fibres were desized by stirring in boiling methanol (1 l of methanol per 200 g of fibres), then filtering, washing with methanol and then with acetone, and then drying them. Thereafter, these fibres are placed in a knife-type grinder for 15 minutes.

100 g of the bis-maleimide of Example 1, 6 g of azodicarbonamide, 1.2 g of the oleate used in Example 1 (Duomeen Odo), and 0.7 g of the laurate used in Example 1 (Cepretol J), are mixed together.

The glass fibres (15 g) are introduced into this mixture and, after homogenization, 10 g of furfurylidene-acetone (cooled to −10° C) are added.

The procedure of Example 1 is followed and a cellular material of density 0.135 – 0.140 is prepared in this way.

The compressive strength is 2.8 – 3 kg/cm² and the LOI is 41.

EXAMPLE 4

1,7-Bis-(furfurylidene)-hepta-2,5-dien-4-one is used as the furfuraldehyde derivative. This product is obtained by reaction of one mol of acetone with 2 mols of the aldehyde resulting from the reaction of one mol of furfuraldehyde with 1 mol of acetaldehyde.

6 g of the furfuraldehyde derivative described above are mixed with the following products used in Example 1: 50 g of the N,N'-4,4'-diphenylmethane-bis-maleimide, 3 g of azodicarbonamide, 1 g of Duomeen Odo and 0.5 g of Cepretol J.

18 g of this mixture are placed in a vessel of the same type as that used in Example 1, but whereof the internal dimensions of the frame are 7 × 7 × 3 cm.

The assembly is placed between the platens of a press preheated to 180° C and is left at this temperature for 45 minutes.

The cellular material thus obtained has a density of 0.114.

What is claimed is:

1. A cellular material based on a polymer with imide groups, characterized in that it is obtained by heating a mixture comprising:

a. a bis-maleimide of the formula

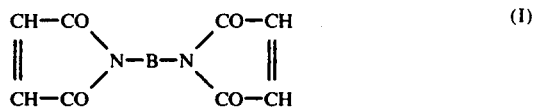 (I)

in which the symbol B represents a phenylene radical or a radical of the formula

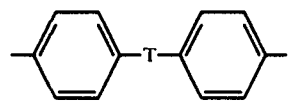

where T represents —CH₂—, —O— or —SO₂—;

b. a furfuraldehyde derivative of the formula

 (II)

in which the symbol Σ represents a radical of the formula

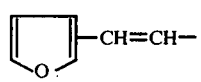

and the symbols R₁ represent the valency bond or a —CH=CH— group, and the symbol Σ' represents a radical Σ, an aliphatic, cycloaliphatic or aromatic monovalent radical R containing up to 12 carbon atoms, or a —R'—CO'R'' radical, where R' represents an aliphatic, cycloaliphatic or aromatic divalent radical containing up to 12 carbon atoms and R'' represents a monovalent radical R or a radical Σ; and c. a blowing agent.

2. A cellular material according to claim 1, characterized in that the weight ratio of bis-maleimide/furfuraldehyde derivative is between 5/1 and 15/1 and the amount of blowing agent represents from 1 to 15% of the weight of the combination of bis-maleimide + furfuraldehyde derivative.

3. A cellular material according to claim 1, characterized in that the weight ratio of bis-maleimide/furfuraldehyde derivative is between 8/1 and 12/1 and the amount of blowing agent represents from 2 to 10% of the weight of the mixture of bis-maleimide + furfuraldehyde derivative.

4. A cellular material according to claim 1, characterized in that the temperature at which the mixture heated is between 150° and 200° C.

5. A cellular material according to claim 1, characterized in that the blowing agent is azodicarbonamide.

6. A cellular material according to claim 1, characterized in that the initial mixture also comprises up to 5%, relative to the weight of the mixture of bis-maleimide + furfuraldehyde derivative, of a cell-forming agent.

7. A cellular material according to claim 1, characterized in that the initial mixture furthermore comprises up to 20% relative to the weight of the mixture of bis-maleimide + furfuraldehyde derivative, of a fibrous material.

8. A cellular material according to claim 7, in which the fibrous material consists of glass fibres.

* * * * *